US008022133B2

(12) United States Patent
Xu et al.

(10) Patent No.: US 8,022,133 B2
(45) Date of Patent: Sep. 20, 2011

(54) CO-ADDITIVE COMPOSITIONS AND METHODS FOR APPLYING CO-ADDITIVE COMPOSITIONS INTO NUCLEATED POLYMER COMPOUNDS

(75) Inventors: Jiannong Xu, Spartanburg, SC (US); Jiang Li, Spartanburg, SC (US); Benjamin W. Bolt, Easley, SC (US); Kemper David Lake, Jr., Spartanburg, SC (US); Jason Dean Sprinkle, Woodruff, SC (US); Brian Michael Burkhart, Greenville, SC (US); Keith Allen Keller, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 1299 days.

(21) Appl. No.: 11/045,630

(22) Filed: Jan. 28, 2005

(65) Prior Publication Data

US 2006/0173108 A1 Aug. 3, 2006

(51) Int. Cl.
*B29C 47/00* (2006.01)
*C08G 67/02* (2006.01)
*C08K 5/00* (2006.01)
*C08K 5/15* (2006.01)

(52) U.S. Cl. ........ 524/528; 524/582; 524/612; 524/108; 524/109; 524/110

(58) Field of Classification Search .................. 524/108, 524/242, 313, 515, 339, 340, 343, 351, 352, 524/353, 370, 500, 528, 582, 612, 107, 109, 524/110
See application file for complete search history.

(56) References Cited

U.S. PATENT DOCUMENTS

| | | | |
|---|---|---|---|
| 4,016,118 A | 4/1977 | Hamada et al. ............. 260/17.4 |
| 4,251,407 A | 2/1981 | Schroeder et al. .......... 260/23 R |
| 4,314,039 A | 2/1982 | Kawai et al. ..................... 525/1 |
| 4,371,645 A | 2/1983 | Mahaffey, Jr. ................ 524/108 |
| 4,532,280 A | 7/1985 | Kobayashi et al. ........... 524/108 |
| 4,536,531 A * | 8/1985 | Ogawa et al. ................. 524/135 |
| 4,977,033 A | 12/1990 | Akao ............................ 428/516 |
| 5,001,176 A * | 3/1991 | Nakazima ...................... 524/48 |
| 5,023,120 A | 6/1991 | Akao ............................ 428/35.9 |
| 5,049,605 A | 9/1991 | Rekers .......................... 524/108 |
| 5,084,316 A | 1/1992 | Akao ......................... 428/36.92 |
| 5,443,872 A * | 8/1995 | Akao et al. .................. 428/35.7 |
| 5,910,545 A * | 6/1999 | Tsai et al. ..................... 525/178 |
| 5,961,914 A * | 10/1999 | Mannion et al. ............. 264/544 |
| 6,127,470 A | 10/2000 | Cobb, III et al. ............. 524/367 |
| 6,238,615 B1 | 5/2001 | Kobayashi et al. ........... 264/537 |
| 6,245,843 B1 | 6/2001 | Kobayashi et al. ........... 524/109 |
| 6,362,258 B1 * | 3/2002 | Avakian et al. .............. 524/100 |
| 6,417,254 B1 * | 7/2002 | Kobayashi .................... 524/108 |
| 6,495,620 B1 * | 12/2002 | Jones et al. ................... 524/108 |
| 6,534,579 B1 * | 3/2003 | Nishijima et al. ............ 524/340 |
| 6,592,988 B1 * | 7/2003 | Thompson et al. ........... 428/375 |
| 6,593,427 B2 | 7/2003 | Kobayashi et al. ........... 525/194 |
| 6,673,856 B1 | 1/2004 | Mentink ....................... 524/110 |
| 7,262,236 B2 * | 8/2007 | Xie et al. ...................... 524/108 |
| 2001/0040320 A1 * | 11/2001 | Kobayashi et al. ........... 264/537 |
| 2002/0169429 A1 * | 11/2002 | Li et al. ........................ 604/370 |
| 2003/0055179 A1 * | 3/2003 | Ota et al. ...................... 525/242 |
| 2003/0109610 A1 | 6/2003 | Nomoto et al. ............... 524/108 |
| 2004/0242803 A1 * | 12/2004 | Ohme et al. .................. 525/400 |
| 2006/0047096 A1 * | 3/2006 | Takahashi et al. ............ 526/352 |

FOREIGN PATENT DOCUMENTS

| | | |
|---|---|---|
| EP | 0361087 | 4/1990 |
| JP | 2-59587 | 2/1990 |
| JP | 7-278362 | 10/1995 |
| JP | 09-104788 A | 4/1997 |
| JP | 10-30165 | 3/1998 |
| JP | 10-060165 | 3/1998 |
| JP | 2001-261971 | 9/2001 |
| JP | 2002-332359 | 11/2002 |
| JP | 2003-96246 | 4/2003 |
| JP | 3463841 B2 | 11/2003 |
| WO | WO0078828 | * 12/2000 |
| WO | WO/01/53369 | * 7/2001 |
| WO | WO 02/34827 | 2/2002 |
| WO | WO/03/014224 | * 2/2003 |
| WO | WO 03/093360 | 11/2003 |

OTHER PUBLICATIONS

STN Search Report pp. 1-2.*
Aldrick Catalogue—p. 1371 (1999) (2 pages total).*
Pending Milliken Case No. 5794, entitled "Method & Composition for Reducing Plate-Out in the Manufacture of Plastic Articles" to Keegan et al.; filed Jan. 28, 2005. Common Assignee "Milliken & Company".

* cited by examiner

*Primary Examiner* — Basia Ridley
*Assistant Examiner* — Alexander C Kollias
(74) *Attorney, Agent, or Firm* — Robert M. Lanning (57) ABSTRACT

It is possible to improve significantly the optical performance of diacetal or DBS-based nucleating or clarifying agents using a co-additive. Haze is a measure of the lack of clarity in a thermoplastic or plastic material. A low level of haze is usually quite desirable, and nucleating/clarifying agents are designed to reduce the degree of haze in a plastic or thermoplastic material. A co-additive may be used in connection with a nucleating/clarifying agents in a polymer or copolymer to achieve even greater results in terms of improved clarity (reduced haze), or in terms of a higher crystallization temperature (Tc) of the polymer. A method for reducing haze in polymer articles using a co-additive composition in addition to nucleating and clarifying agents is disclosed.

14 Claims, 7 Drawing Sheets

CO-ADDITIVE COMPOSITIONS AND METHODS FOR APPLYING CO-ADDITIVE COMPOSITIONS INTO NUCLEATED POLYMER COMPOUNDS

BACKGROUND OF THE INVENTION

Numerous nucleating and clarifying agents are used as plastic additives. Such compounds assist in optically clarifying plastics or otherwise improving the processing or physical characteristics of polymers in plastic products. Many plastic products sold and used are made from polymer materials that contain nucleating or clarifying agents within the polymer.

The use of clarifying agents to reduce haze in articles manufactured from crystalline polyolefin resins is well known in the art. Representative acetals of sorbitol and xylitol, which have been employed as clarifying agents, are disclosed generally in the following patents:

Hamada et al., U.S. Pat. No. 4,016,118, dibenzylidene sorbitols

Kawai, et al., U.S. Pat. No. 4,314,039, di(alkylbenzylidene) sorbitols

Mahaffey, Jr., U.S. Pat. No. 4,371,645, diacetals of sorbitols having at least one chlorine or bromine substituent Kobayashi, et al., U.S. Pat. No. 4,532,280, di(methyl or ethyl substituted benzylidene) sorbitols Rekers, U.S. Pat. No. 5,049,605, bis(3,4-dialkylbenzylidene) sorbitols including substituents forming a carbocyclic ring.

Co-additives have been used in combination with such clarifiers based on diacetals of sorbitol and xylitol to improve certain properties, such as:

Mentink, U.S. Pat. No. 6,673,856: discloses co-additives to improve the flow behavior and thermal stability of clarifiers based on diacetals of sorbitol and xylitols;

Kobayashi, et al., U.S. Pat. No. 6,245,843 discloses using certain "binders" to depress the melting temperature, improving the dispersion, and improving the flow property of clarifiers based on diacetals of sorbitols and xylitols;

Among clarifiers based on diacetals of sorbitol and xylitol, MILLAD® 3988 clarifying agent is a commercially successful clarifier for polypropylene. It is a dimethyl substituted dibenzylidene sorbitol ("DMDBS"), 1,3:2,4-bis(3,4 dimethyl benzylidene sorbitol). MILLAD® 3988 clarifying agent is manufactured and distributed by Milliken & Company of Spartanburg, S.C.

MILLAD® 3988 clarifying agent can achieve very good optical properties in polypropylene ("PP") at its optimum loadings, for example, at loadings near 2500 parts per million ("ppm"). However, its clarifying function is not as great when the loading is relatively low, such as 1000 ppm, for example. This is generally true of most clarifiers based on diacetals of sorbitol and xylitol. Though many prior art references have disclosed using co-additives in combination with such clarifiers to achieve certain benefits, none of the prior art references known to date have disclosed a method and composition that may be employed to improve the clarifying function of such clarifiers at relatively low loadings, namely, to improve the low level efficacy of these clarifiers.

In some applications, low levels of such clarifiers are highly be desirable. For example, it will be more economic to use less clarifier, and it will reduce any possible plate out, blooming, or extraction. A method, process, or chemical composition that makes it possible to improve or increase the low level efficacy of nucleating or clarifying agents is highly desirable. The current invention is directed towards such improvements.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

To help understanding the current invention, this disclosure defines "critical concentration". For any clarifiers, it is possible to plot haze levels (it is defined and can be measured according to ASTM D1003-00) of the plastic article versus the concentration of the clarifier in the article. The curve looks typically like the one shown in FIG. 1. Starting with the control haze (A) at 0% clarifier concentration, haze starts to decrease as the concentration of the clarifier increases. The haze value reaches a minimum (B) when the loading hits its optimum for this particular clarifier. If the concentration keeps increasing, the haze "levels out", or starts to increase if the loading is too high. As a result, this particular clarifier reduces haze of the plastic article by (A–B) units at its optimum loading.

Figure 1:
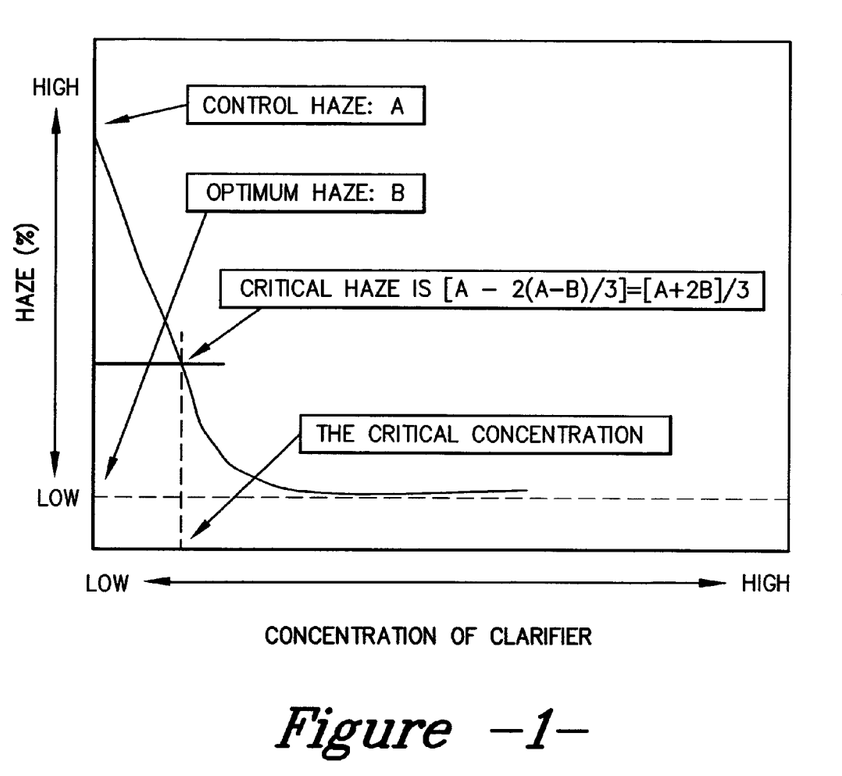
FIG. 1 is a sketch of a typical haze curve (haze versus concentration) of a clarifier.

The "critical concentration" is the concentration when the decrease of the haze is ⅔ of the total haze reduction observed under those conditions, namely, the concentration when the haze reduction is 2(A–B)/3. The critical haze of the plastic article, at the critical concentration, should be $[A-2(A-B)/3]=[A+2B]/3$. Thus, "critical concentration" is a very convenient method to represent the effect of a particular co-additive on clarifier performance.

Figure 2:
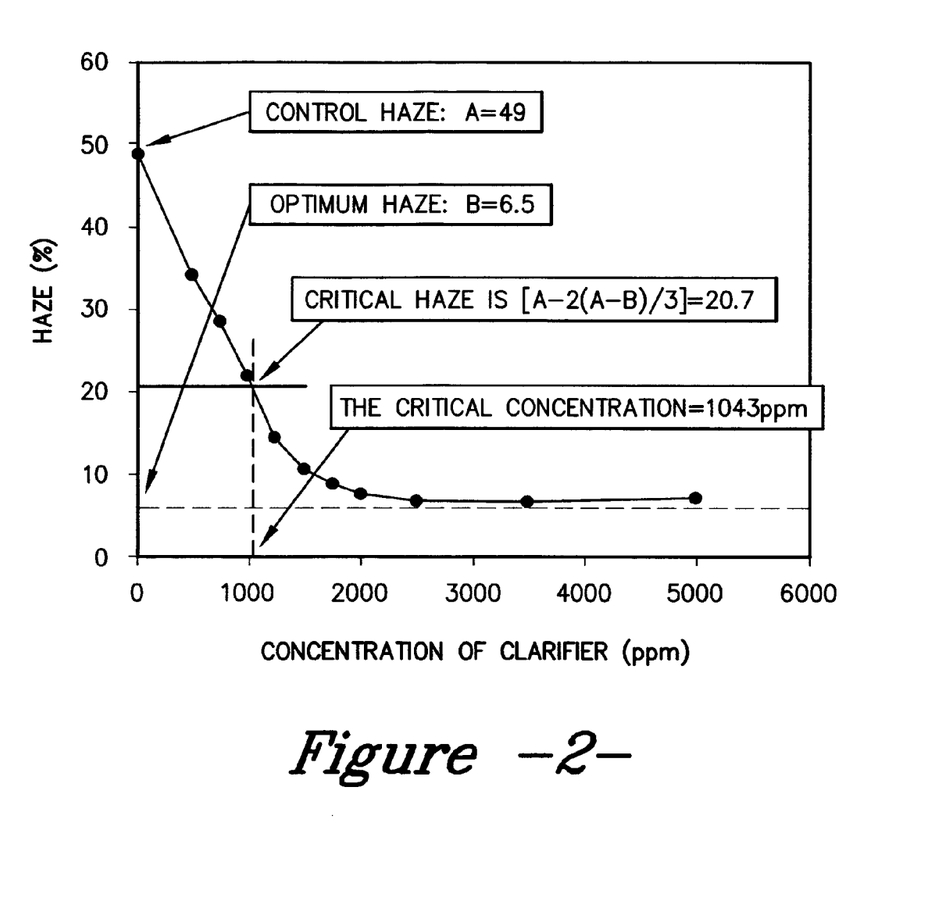
FIG. 2 is a graph showing haze of plastic articles clarified with MILLAD® 3988 clarifying agent at various concentrations, under standard processing conditions in a polypropylene random copolymer (RCP) resin.

For example, FIG. 2 shows the haze of 50 mil polypropylene random copolymer (RCP) plaques clarified using MILLAD® 3988 clarifying agent versus the concentration of MILLAD® 3988 clarifying agent in the system. Control haze (0% clarifier) in this case is 49 (A=49), then it follows the general trend of a clarifier, haze of the plaque starts to decrease as the loading of MILLAD® 3988 clarifying agent increases. Finally, it reaches the lowest haze of ca. 6.5 (B=6.5) at the concentration of 2500-3500 ppm or so. When more MILLAD® 3988 clarifying agent is loaded, haze starts to increase. The critical concentration of MILLAD® 3988 clarifying agent in this RCP resin will be the concentration when the haze of the clarified article is [49+2*6.5]/3=20.7. A horizontal line is drawn at 20.7 haze value in FIG. 2, and it intercepts with the haze curve of MILLAD® 3988 clarifying agent at loading of 1043 ppm. As a result, 1043 ppm is the critical concentration of MILLAD® 3988 clarifying agent in this RCP resin, and the critical haze is 20.7.

The critical haze could be understood as a practically acceptable haze in the market for that clarifier, when lower cost is desired. For example, MILLAD® 3988 clarifying agent gives an optimum haze of 6.5 at 2500 ppm and it is desired in many markets where the clarity is extremely important. On the other hand, a haze of 20.7 is acceptable in certain markets where the cost is more sensitive, and only 1043 ppm MILLAD® 3988 clarifying agent is needed for this purpose. This is just one illustration of the value of this invention.

From the above discussion, one can tell that lower critical concentration is desired for a clarifier because it indicates a more efficient clarifier, which achieves critical haze at lower loadings. Therefore, the invention, which helps to identify and evaluate the decrease in the critical concentration of a clarifier, is desirable. Such a technology enables less clarifier to achieve the same haze, which is highly desirable when large volumes are processed.

The current invention helps improve the low level efficacy of dibenzylidene-based nucleating or clarifying agents by using certain co-additives. In more measurable statement, such co-additives help decrease the critical concentration of the clarifiers, allowing the clarifiers to achieve fairly good clarification function at lower concentration. In at least one example, the critical concentration of MILLAD® 3988 clarifying agent was cut to almost half by using a co-additive. In that case, 545 ppm MILLAD® 3988 clarifying agent, with the help of a co-additive, can achieve the same optical performance of 1043 ppm MILLAD® 3988 clarifying agent.

The current invention is directed toward methods and compositions using co-additives to increase the low level efficacy, or decrease the critical concentration of clarifiers. Polymer articles may be manufactured having one or more co-additives and one or more nucleating or clarifying agents. Also, a method of reducing critical concentration in polymer articles using a co-additive composition in addition to nucleating and clarifying agents is also disclosed herein. In some applications, the polymer composition may be provided with a co-additive, said co-additive having an average molecular weight of 300, or more. In other applications of the invention, a co-additive is provided which has an average molecular weight of between 400 and 10,000,000. Furthermore, plastic or polymeric articles of manufacture may be constructed from any known method, using the compositions of the invention. In one aspect of the invention, the co-additive is provided in a concentration of 0.02 parts by weight of less, or alternatively, 0.01 or less. The diacetal based clarifier may be provided in a use level of 0.15 or less, in some applications. For yet other applications, such as copolymers of ethylene oxide (EO), an average molecular weight of 300-10,000 may be used, and may optionally have a percentage of EO of 10-95%. Other embodiments may employ polycaprolactones as co-additives, using average molecular weights of 300-5,000.

Some applications of the invention may employ ionic liquids as co-additives, such as set forth below:

wherein $R_1$, $R_2$, $R_3$, $R_4$, and $R_5$ are same or different alkyl groups, and the anion A is selected from the group consisting of: chloride, bromide, tetrafluoroborate, and methosulfates.

In yet other applications of the invention, processing may be provided using techniques of injection molding, extrusion, blow molding, thermoforming, injection stretch blow molding, film casting, or film blowing.

The method of the invention may reduce the critical concentration of the diacetal based clarifier by 10%, by 20%, by 30%, or 40%, or more, depending upon the particular application.

At least one application of the invention employs a block copolymer, as further described herein. In other applications, the use level of said co-additive is about 0.05 parts by weight or less, in relation to 100 parts by weight of the polyolefin resin.

Thermoplastic Polymers or Copolymers

Polyolefins have been widely used in applications like houseware containers, bottles, cups, syringes, pipes, films etc. through various processing methods such as injection molding, extrusion blow molding, thermoforming, casting, etc. In many applications, transparency or see through ability is desired. Clarifiers like MILLAD® 3988 clarifying agent are used in these applications to give the plastic articles the desired optical properties. Typical polymers using clarifying or nucleating agents are polypropylene homopolymer (HPP), polypropylene random copolymer (RCP), polypropylene impact copolymer (ICP). MILLAD® 3988 clarifying agent also clarifies some polyethylene resins, like linear low-density polyethylene (LLDPE), low-density polyethylene (LDPE), and high-density polyethylene.

The present invention employs certain co-additives to improve the low level efficacy, or decrease the critical concentration of clarifiers based on diacetals of sorbitol and xylitol. Many tests have been done in various resins and improvement of optical properties have been observed.

Derivatives of Dibenzylidene

The clarifying agents of interest include diacetals of sorbitol and xylitol having the general formula (I)

where $R_1$, $R_2$, $R_3$, $R_4$, $R_5$, $R_6$, $R_7$, $R_8$, $R_9$, $R_{10}$ are the same or different and each represents a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, or a 4 or 5 membered alkyl group forming a carbocyclic ring with adjacent carbon atoms of the unsaturated parent ring; n represents 0 or 1. Of particular interest are clarifying agents where n is 1 and $R_1$, $R_2$, $R_3$, $R_4$, $R_5$, $R_6$, $R_7$, $R_8$, $R_9$, $R_{10}$ are selected from $C_{1-4}$ alkyl, chlorine, bromine, thioether and a 4-membered alkyl group forming a carbocyclic ring with adjacent carbon atoms of the unsaturated parent ring. Examples of specific clarifiers include: dibenzylidene sorbitol, di(p-methylbenzylidene) sorbitol, di(o-methylbenzylidene) sorbitol, di(p-ethylbenzylidene) sorbitol, bis(3,4-dimethylbenzylidene) sorbitol, bis(3,4-diethylbenzylidene) sorbitol, bis(5',6',7',8'-tetrahydro-2-naphthylidene) sorbitol, bis(trimethylbenzylidene) xylitol, and bis(trimethylbenzylidene) sorbitol. Also within the scope of the present invention are compounds made with a mixture of aldehydes, including substituted and unsubstituted benzaldehydes, such as Kobayashi, et al., U.S. Pat. No. 4,532,280 and Kobayashi, et al., U.S. Pat. No. 4,954,291.

The clarifying agents of interest also include diacetals of sorbitol and xylitol having the general formula (II).

where R is selected from the group consisting of: alkenyls, alkyls, alkoxys, hydroxyl alkyls, and haloalkyls, and derivatives thereof; $R_1$, $R_2$, $R_3$, $R_4$, $R_5$, $R_6$, $R_7$, $R_8$, $R_9$, $R_{10}$ are the same or different and each represents a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, or a 4 or 5 membered alkyl group forming a carbocyclic ring with adjacent carbon atoms of the unsaturated parent ring; n represents 0 or 1. Of particular interest are clarifiers where R is methyl, ethyl, propyl, butyl, allyl, or crotyl, $R_1$, $R_2$, $R_3$, $R_4$, $R_5$, $R_6$, $R_7$, $R_8$, $R_9$, $R_{10}$ are selected from $C_{1-4}$ alkyl, chlorine, bromine, thioether and a 4-membered alkyl group forming a carbocyclic ring with adjacent carbon atoms of the unsaturated parent ring. Examples of specific clarifiers include: 1,3:2,4-bis(4-ethylbenzylidene)-1-allyl-sorbitol, 1,3:2,4-bis(3'-methyl-4'-fluoro-benzylidene)-1-propyl-sorbitol, 1,3:2,4-bis(5',6',7',8'-tetrahydro-2-naphthaldehydebenzylidene)-1-allyl-xylitol, bis-1, 3:2-4-(3',4'-dimethylbenzylidene)-1"-methyl-1-propyl-sorbitol, and 1,3:2,4-bis(3',4'-dimethylbenzylidene)-1-propyl-xylitol.

Co-Additives

Various co-additives can be employed in the practice of the invention. The examples and Tables herein list only a few of the co-additives that can be used in the practice of the invention, and the practice and scope of the invention is not limited to only those species recited herein. Further, there are many, many different DBS derivatives that could be employed, and the invention is not limited to any particular DBS derivative for application of the co-additives of the invention.

In the present invention, co-additives used to improve the low level efficacy of clarifiers containing at least one member selected from the group consisting of (a) poly(ethylene glycol) and their derivatives like poly(ethylene glycol) alkyl ether, poly(ethylene glycol) alkyl ester; (b) copolymers containing segments of ethylene oxide, such as blockcopolymers of ethylene oxide and propylene oxide, blockcopolymers of poly(ethylene glycol) and another polymer such as, but not limited to, polyethylene, polypropylene, polystyrene, poly(dimethylsiloxane), or polycaprolactone; (c) poly(vinyl alcohol), poly(allyl alcohol), and blockcopolymers of poly(vinyl alcohol) or poly(allyl alcohol), a few examples are poly(styrene-co-allyl alcohol), poly(vinyl alcohol-co-vinyl acetate), and poly(vinyl alcohol-co-ethylene); (d) polycaprolactone derivatives like polycaprolactone diol, polycaprolactone triol, polycaprolactone tetraol; (e) polyesters based on aliphatic di-alcohols and aliphatic di-carboxylic acid, examples include, but not limited to, poly(ethylene azelate), poly(ethylene succinate), poly(1,3-propylene succinate), poly(1,3 propylene adipate), poly(ethylene adipate), poly(1,4-butylene adipate), poly(di(ethylene glycol) adipate); (f) polycarbonate and derivatives like poly(polytetrahydrofuran carbonate) diol, poly(hexamethylene carbonate), poly(propylene carbonate); g) polyamines like polyethyleneimine; h) ionic liquid based on imidazole chemistry, i) lithium containing compounds like lithium chloride, lithium bromide, lithium stearate, lithium lactate, lithium trifluoromethanesulfonate, and lithium benzoate; j) any mixers of the above compounds.

FIG. 2 shows a plot of haze versus loading level for MILLAD® 3988 clarifying agent of injection molded 50 mil plaques, under standard processing conditions without co-additives. Standard processing conditions refer to a) mixing all components in a high intensity mixer for 1 minute; b) compounding the mixed powder using a single screw extruder at ca. 230 degrees C.; c) molding the compounded resin into 50 mil plaques at 230 degrees C. and 2.4 cc/second injection rate; d) resin used is a polypropylene random copolymer, RCP SA849. The critical concentration of MILLAD® 3988 clarifying agent in this resin under the standard processing conditions is 1040 ppm, as mentioned above. The following examples demonstrate how the current invention decreases the critical concentration of MILLAD® 3988 clarifying agent, namely allowing less amount of MILLAD® 3988 clarifying agent to achieve the same haze.

Example 1

PEG3400 as a co-additive for MILLAD® 3988 Clarifying Agent in a RCP Resin

PEG 3400 is employed as a co-additive in this example. PEG 3400 is chemically known as poly(ethylene glycol), and 3400 refers to the average molecular weight of this particular grade. The general chemical structure of PEG is where n is the repeating unit. The value of n determines the molecular weight of the polymer. Such structure is also termed PEO as poly(ethylene oxide) when molecular weight is high.

Figure 3:
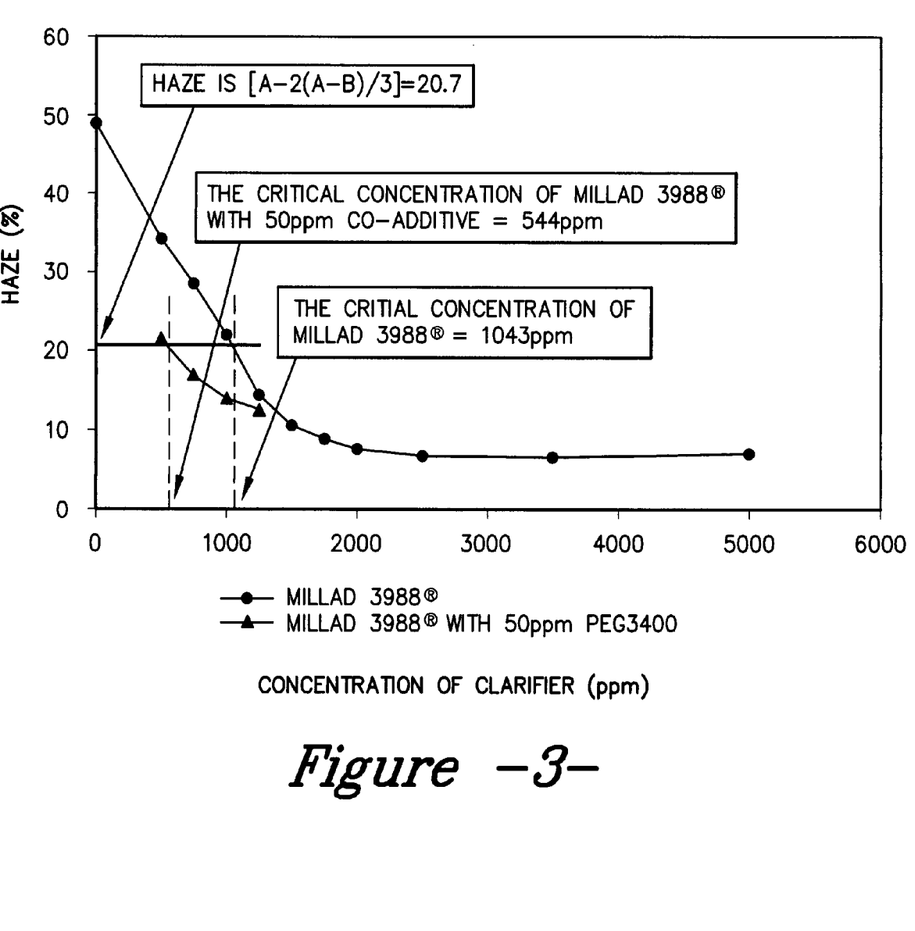
FIG. 3 shows performance of MILLAD® 3988 clarifying agent and MILLAD® 3988 clarifying agent with PEG 3400 as a co-additive (use level of PEG 3400 is 50 ppm) under standard processing conditions in a RCP resin.

PEG 3400 was added to the formulation at 50 ppm along with a certain given loading of MILLAD® 3988 clarifying agent. The haze performance of this formulation was then compared with MILLAD® 3988 clarifying agent without co-additive at the same loading. Both formulations were processed under standard processing conditions. FIG. 3 shows the comparison between the two.

MILLAD® 3988 clarifying agent at 50 ppm with PEG 3400 shows less haze than MILLAD® 3988 clarifying agent alone at all loadings tested (500, 750, 1000 and 1250 ppm). At 500 ppm of MILLAD® 3988 clarifying agent, haze reduction is ca. 12 haze units; at 750 ppm of MILLAD® 3988 clarifying agent, haze reduction is ca. 11 haze units; at 1000 ppm of MILLAD® 3988 clarifying agent, haze reduction is ca. 8 haze units; at 1250 ppm of MILLAD® 3988 clarifying agent, haze reduction is ca. 1.5 haze units. An improvement of 2 haze units is visible to human eyes. Such improvement is significant and unexpected, given that only 50 ppm PEG 3400 was used. The critical concentration for this new formulation, MILLAD® 3988 clarifying agent with 50 ppm PEG3400, is 545 ppm based on the calculation. Namely, 545 ppm MILLAD® 3988 clarifying agent with the help of 50 ppm PEG3400, achieved a haze of 20.7, which could only be achieved by 1043 ppm MILLAD® 3988 clarifying agent if used alone. From 1043 ppm to 545 ppm, the critical concentration is reduced by 48%!

This example used one conditions, which is termed standard condition. This is listed as one example and the current invention applies to other processing conditions as well. For example, this co-additive formulation was also tested at 200 degrees C. molding temperature, while other processing conditions were kept the same. The extent of haze reduction for MILLAD® 3988 clarifying agent is similar for loadings from 500 ppm to 1250 ppm. If mixing conditions changes from high intensity mixing to low intensity mixing, the extent of haze reduction by using this co-additive formulation still holds the same.

The low level efficacy of MILLAD® 3988 clarifying agent has been dramatically improved after using a very small amount of co-additive, 50 ppm PEG 3400. Several PEG or PEO grades with different molecular weights were tested also, and for PEG or PEO compounds with the average molecular weight equal to or larger than 600, they work well as co-additives to improve the low level efficacy or decrease the critical concentration of MILLAD® 3988 clarifying agent. PEG 1000 (1000 refers to the average molecular weight of this PEG grade) is about the same as PEG 3400 in terms of improving the low level efficacy of MILLAD® 3988 clarifying agent. Both are the best among the group tested.

Example 2

Polycaprolactone Triol as a Co-Additive for MILLAD® 3988 Clarifying Agent in a RCP Resin Polycaprolactone triol (Mn=900) was used as a co-additive for MILLAD® 3988 clarifying agent in this example to decrease its critical concentration. General chemical structure of polycaprolactone triol is as follows:

where m, n, p stand for the number of repeating units for each strand, and they could be same or different. The average molecular weight of the particular grade used is ca. 900 g/mol and is a waxy material at room temperature. 50 ppm of polycaprolactone triol was added to the formulation in liquid after being preheated at 60 degrees C. Both MILLAD® 3988 clarifying agent formulations with and without co-additive were extruded at 230 C using a single screw extruder and molded at 230 degrees C. in a random polypropylene copolymer, RCP SA849.

Figure 4:
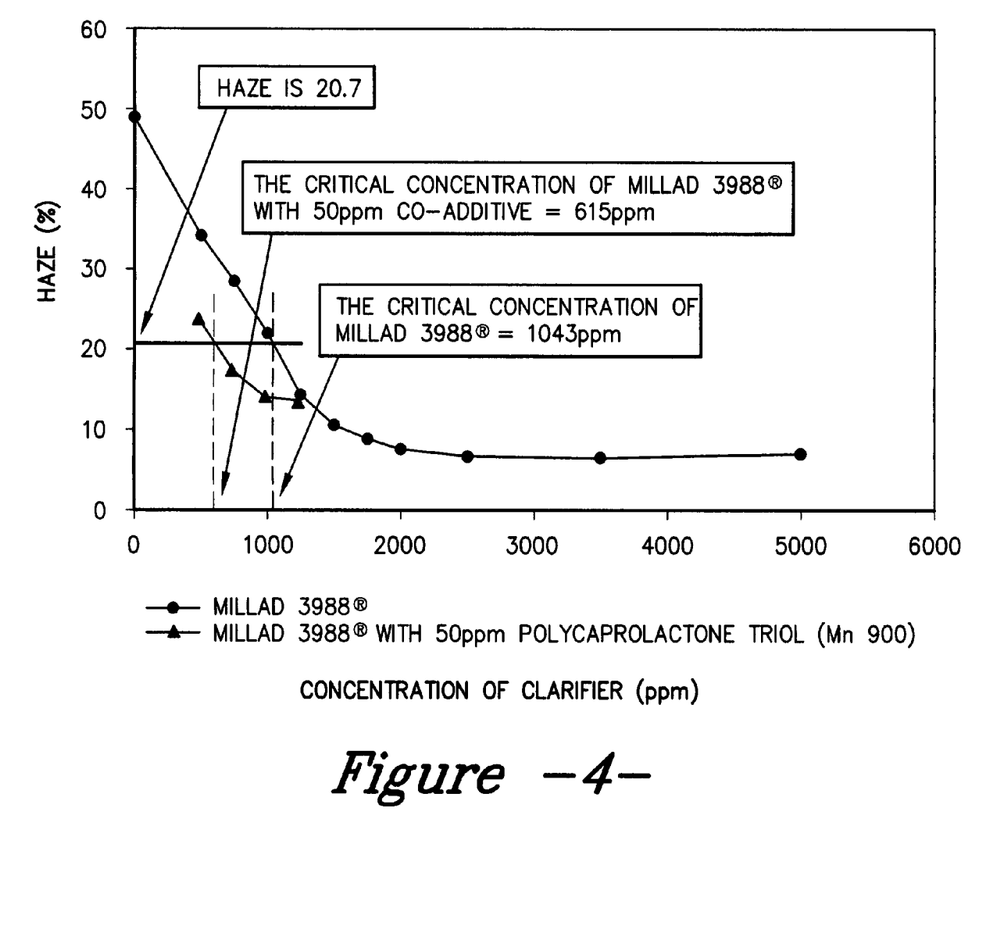
FIG. 4 depicts the performance of MILLAD® 3988 clarifying agent and MILLAD® 3988 clarifying agent with polycaprolactone triol (Mn 900) as a co-additive (use level is 50 ppm), under standard processing conditions in a RCP resin.

FIG. 4 shows the haze curve of MILLAD® 3988 clarifying agent without and with polycaprolactone triol (Mn 900) as a co-additive. It dramatically improves the low level efficacy of haze performance for MILLAD® 3988 clarifying agent. The extent of improvement is similar as PEG 3400, as discussed in Example 1. Calculation of the critical concentration in this case resulted in 615 ppm, namely, 615 ppm MILLAD® 3988 clarifying agent with 50 ppm polycaprolactone triol (Mn 900) can achieve 20.7 haze, which could only be achieved by using 1043 ppm MILLAD® 3988 clarifying agent alone. From 1043 ppm to 615 ppm, the critical concentration is reduced by 41%.

This co-additive formulation was also tested at 200 degrees C. molding temperature, while other processing conditions were kept the same. The extent of haze reduction for MILLAD® 3988 clarifying agent is similar for loadings from 500 ppm to 1250 ppm.

Polycaprolactone triol with different molecular weights and several polycaprolactone diols and tetraols with various molecular weights were also tested. Most of them work well as co-additives to improve the low level efficacy of MILLAD® 3988 clarifying agent. Among all the samples tested in this class, polycaprolactone triol (Mn=900) and polycaprolactone diol (Mn=1250) are among the best. The chemical structure of polycaprolactone diol is as follows, The chemical structure of polycaprolactone tetraol is as follows, Example 3

Figure 5:
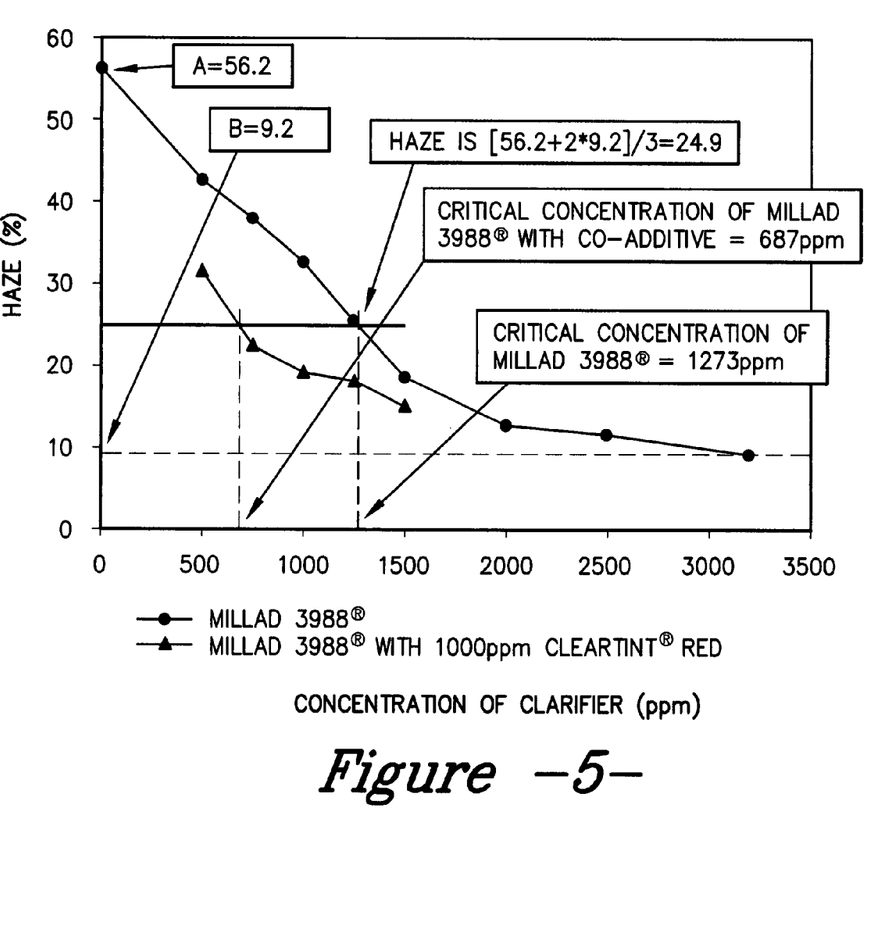
FIG. 5 illustrates results using CLEARTINT® Red colorant (use level 1000 ppm) as a co-additive for MILLAD® 3988 clarifying agent in a polypropylene homopolymer (HPP) resin under standard processing conditions.

CLEARTINT® Red Colorant as a Co-Additive for MILLAD® 3988 Clarifying Agent in a HPP Resin This example employs CLEARTINT® Red colorant and its corresponding coupler as co-additives. Reference is made to FIG. 5.

CLEARTINT® Red colorant is a polymeric colorant product produced and manufactured by Milliken & Company of Spartanburg, S.C., USA. 1000 ppm CLEARTINT® Red colorant was added as masterbatch and Hobalt mixed and single screw compounded. The formulation was then molded at 230 degree C. In this case, a polypropylene homopolymer was used as the base resin. Haze curve of MILLAD® 3988 clarifying agent, and MILLAD® 3988 clarifying agent with 1000 ppm CLEARTINT® Red colorant as co-additive is shown in FIG. 5. For MILLAD® 3988 clarifying agent alone, control haze A=56.2, and the optimum haze=9.2, and the critical haze=[56.2+2*9.2]/3=24.9. Critical concentration is, as shown in FIG. 5, 1273 ppm. In the case of MILLAD® 3988 clarifying agent with 1000 ppm CLEARTINT® Red colorant as co-additive, the critical concentration is reduced to 687 ppm. With the help of 1000 ppm CLEARTINT® Red colorant, 687 ppm can achieve the critical haze of 24.9, which could be achieved by 1273 ppm MILLAD® 3988 clarifying agent. From 1273 ppm to 687 ppm, it is a 46% in critical concentration! As a result, low level efficacy of MILLAD® 3988 clarifying agent is highly improved by using co-additives like CLEARTINT® Red colorant.

Other CLEARTINT® colors were also tested and they are good co-additives for improving the low level efficacy or reducing the critical concentration of MILLAD® 3988 clarifying agent.

A certain color is obtained when a certain chromophore is attached to the benzene ring of the coupler structure, which is shown below, where "EO" denotes an ethylene oxide moiety, and "PO" denotes a propylene oxide moiety:

where n, m, z are from 0 to 40
However, it is recognized that the two moieties attached to the Nitrogen could be also designated as $R_1$ and $R_2$, wherein $R_1$ and $R_2$ are selected independently, and each comprise one or more EO or PO groups.

Couplers themselves can also be used as co-additive for MILLAD® 3988 clarifying agent to improve its low level efficacy or decrease its critical concentration. Many couplers were tested, and some of them reduced the critical concentration in a similar manner as CLEARTINT® Red colorant.

Example 4

Figure 6:
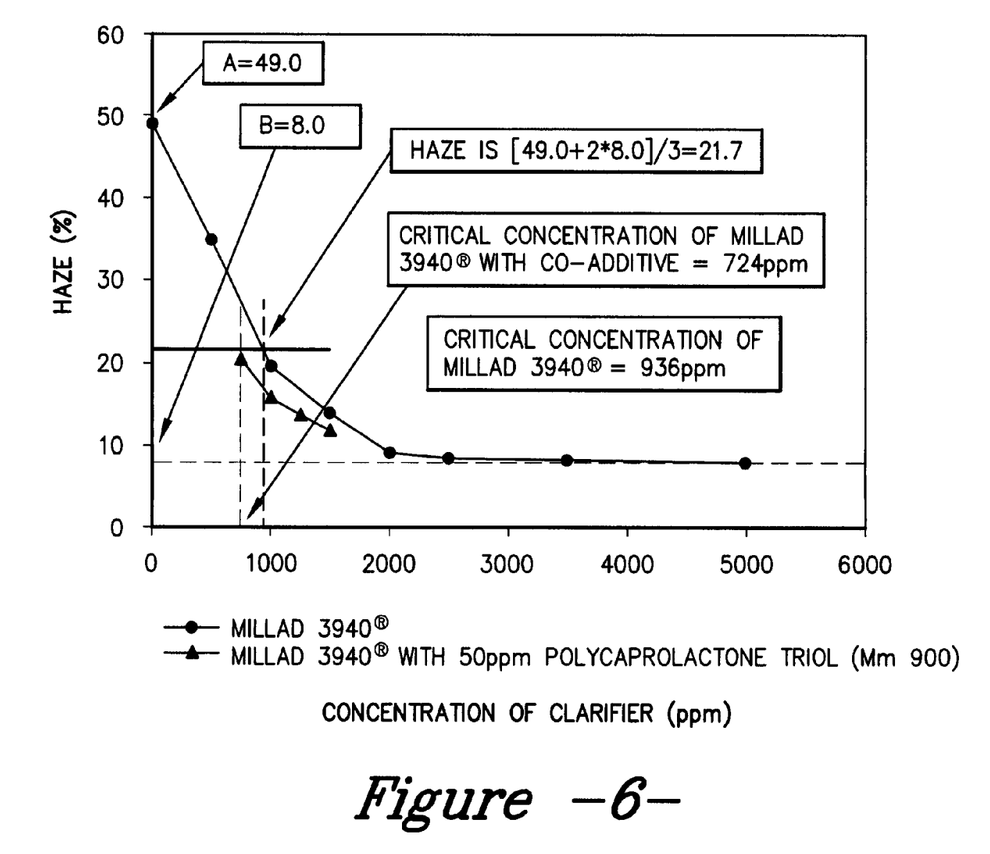
FIG. 6 shows a haze curve of MILLAD® 3940 clarifying agent and MILLAD® 3940 clarifying agent with 50 ppm polycaprolactone triol (Mn 900) as co-additive under standard processing conditions in a RCP resin.

Polycaprolactone Triol as a Co-Additive for MILLAD® 3940 Clarifying Agent in a RCP Resin This example employs polycaprolactone triol (Mn=900) as a co-additive for MILLAD® 3940 clarifying agent in a polypropylene random copolymer resin. MILLAD® 3940 clarifying agent is a product of Milliken & Company, chemically it is known as 1,3:2,4-bis(4-methylbenzylidene)-sorbitol, or MDBS. Polycaprolactone triol was introduced to the formulation at 50 ppm. Haze curve of MILLAD® 3940 clarifying agent with and without polycaprolactone triol is shown in FIG. 6. In this case, A=49.0, B=8.0, and the critical haze is [49.0+2*8.0]/3=21.7. The critical concentration of MILLAD® 3940 clarifying agent is 936 ppm. With the help of 50 ppm polycaprolactone triol (Mn 900), the critical concentration is reduced to 724 ppm, it is a 23% reduction. In conclusion, polycaprolactone triol improved the low level efficacy of MILLAD® 3940 clarifying agent.

Example 5

Figure 7:
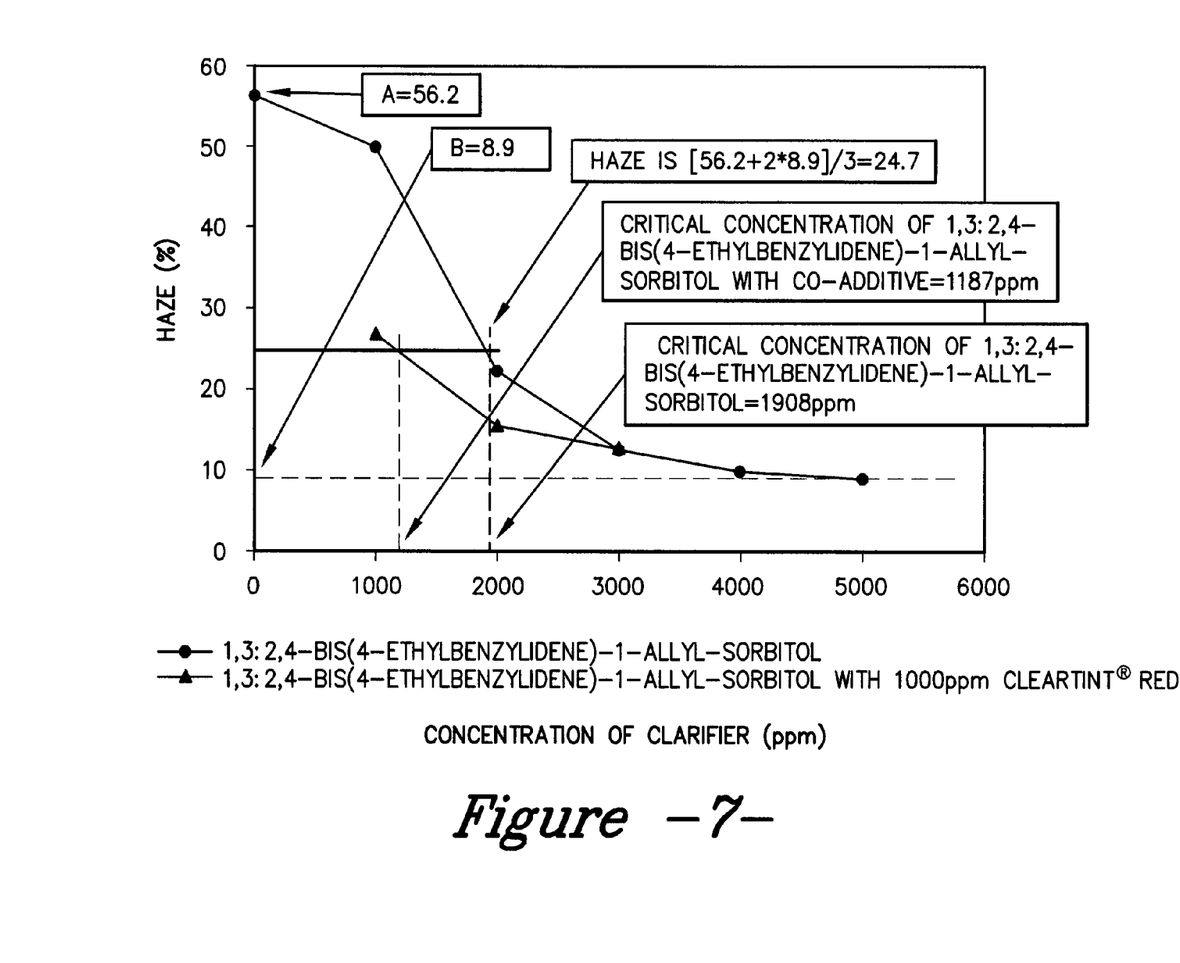
FIG. 7 shows a haze curve of 1,3:2,4-bis(4-ethylbenzylidene)-1-allyl-sorbitol and 1,3:2,4-bis(4-ethylbenzylidene)-1-allyl-sorbitol with 1000 ppm CLEARTINT® Red colorant as co-additive under standard processing conditions in a HPP resin.

CLEARTINT® Red Colorant as a Co-Additive for 1,3:2,4-bis(4-ethylbenzylidene)-1-allyl-Sorbitol in a HPP Resin This example uses CLEARTINT® Red colorant as a co-additive for 1,3:2,4-bis(4-ethylbenzylidene)-1-allyl-sorbitol in a HPP resin. CLEARTINT® Red colorant is a polymeric colorant manufactured and distributed commercially by Milliken and Company of Spartanburg, S.C. The CLEARTINT® Red colorant was added using masterbatch and the final loading is 1000 ppm. Haze curve of 1,3:2,4-bis(4-ethylbenzylidene)-1-allyl-sorbitol with and without the co-additive is shown in FIG. 7. It is obvious that low level efficacy of this clarifier is improved after introducing the co-additive to the formulation. The critical concentration of the clarifier alone is 1908 ppm, while with the help of the co-additive, the critical concentration is reduced to 1187 ppm, a 38% reduction in critical concentration.

Other kinds of CLEARTINT® color and their couplers were also tested and most of them work very well as co-additives to improve the low level efficacy or reduce the critical concentration for this clarifier.

Example 6

Other Co-Additives for MILLAD® 3988 Clarifying Agent in a RCP Resin

In addition to the examples discussed above, numerous materials have been tested, and some of the results are listed in Table 1. A RCP resin was employed and standard processing conditions were used to make plastic parts for haze measurements. For all examples in Table 1, to simplify the experiments, only one loading of MILLAD® 3988 clarifying agent was tested. MILLAD® 3988 clarifying agent was set to 1000 ppm, and the co-additive loading is listed in the table. Haze values of 1000 ppm MILLAD® 3988 clarifying agent, and 1000 ppm MILLAD® 3988 clarifying agent with the co-additive, are listed in the table. The difference is calculated and shown in the table as well. Negative number indicates a haze reduction by using the co-additive, and is desired. A haze reduction of 2 or more is considered significant and a haze reduction of 6 or more is great. As from the previous Examples 1-3, when the co-additive reduces haze for 1000 ppm MILLAD® 3988 clarifying agent, they typically reduces haze of other loadings of MILLAD® 3988 clarifying agent as well, for example, from 500 to 1250 ppm. Though critical concentration was not calculated for these examples listed here, similar results (reducing critical concentration) to those co-additives in Examples 1 to 3 are expected. Furthermore, such examples are not limiting the application of them to other DBS-based clarifying agents. It is a logical expectation that these co-additives also reduces the critical concentration or improve the low level efficacy of other DBS-based clarifying agents, like those co-additives in Example 4 and 5.

Group I (No. I-1 to I-11) co-additives are based on poly (ethylene glycol), blockcopolymers containing at least one block of poly(ethylene glycol), and the random copolymer of ethylene oxide and propylene oxide. In certain cases, various molecular weight of one class was tested. For example, poly (ethylene glycol) of various molecular weight (from 600 to 8,000,000) was tested and all of them are very good at reducing haze (equal to or over 5 units) for 1000 ppm MILLAD® 3988 clarifying agent. Several block and random copolymers of PEG and PPG (various ratio and molecular weight) were tested and two of them are listed in Table 1 (No. I-8 and I-9). All the block and random copolymers of PEG and PPG tested are very good co-additives for reducing haze of 1000 ppm MILLAD® 3988 clarifying agent. Poly(dimethylsiloxane) ethoxylate/propoxylate is a block copolymer of polydimethylsiloxane, poly(ethylene glycol) and poly(propylene glycol) and is also a very effective co-additive for MILLAD® 3988 clarifying agent at reducing haze, and so is the poly(ethylene)-block-poly(ethylene glycol). One can summarize that poly(ethylene glycol) is the functional part, which reduces the haze of MILLAD® 3988 clarifying agent. As a result, it is very reasonable to expect that any copolymers containing segments of ethylene oxide will have similar function, namely, reducing the haze or critical concentration of MILLAD® 3988 clarifying agent.

TABLE 1

Haze Difference of (Δ haze) 1000 ppm MILLAD ® 3988 clarifying agent Without and with Co-Additives, negative number indicates a haze reduction

| Number | Co-additive | Loading of Co-additive (ppm) | Δhaze |
|---|---|---|---|
| | Group 1 co-additive examples in Example 6 | | |
| 1-1 | PEG600 | 100 | −5.3 |
| 1-2 | PEG900 | 100 | −6.0 |
| 1-3 | PEG1000 | 100 | −6.7 |
| 1-4 | PEG8000 | 100 | −5.1 |
| 1-5 | PEO100,000 | 100 | −5.0 |
| 1-6 | PEO900,000 | 100 | −6.1 |
| 1-7 | PEO8,000,000 | 25 | −7.3 |
| 1-8 | PEO-block-PPO-block-PEO (Mn 1900, 50% EO) | 50 | −6.6 |
| 1-9 | Poly(ethyleneglycol-ran-propylene glycol) (Mn 2500) | 100 | −4.5 |
| 1-10 | Poly(dimethylsiloxane) ethoxylate/propylate | 50 | −7.0 |
| 1-11 | Polyethylene-block-poly(ethylene glycol) 50% EO, Mn 920 | 250 | −5.1 |
| | Group 2 co-additive examples in Example 6 | | |
| 2-1 | Poly(ethylene glycol) dioleate | 1500 | −6.4 |
| 2-2 | Poly(ethylene glycol) monooleate | 500 | −6.7 |
| 2-3 | Poly(ethylene oxide) 4-nonylphenyl 3-sulfopropyl ether, K | 50 | −5.3 |
| 2-4 | Poly(oxyethylene) oleyl ether (Mn 1150) | 50 | −5.7 |
| 2-5 | Polyoxyethylene sorbitol hexaolate | 50 | −6.5 |
| 2-6 | Polyoxythylene sorbitan tetraoleate | 50 | −3.9 |
| | Group 3 co-additive examples in Example 6 | | |
| 3-1 | Polystyrene-co-allyl alcohol | 100 | −6.4 |
| 3-2 | Poly(vinyl alcohol-co-vinyl acetate) | 50 | −6.4 |
| 3-3 | Poly(vinyl alcohol-co-ethylene) | 50 | −4.8 |
| | Group 4 co-additive examples in Example 6 | | |
| 4-1 | Poly(ethylene azelate) | 50 | −4.3 |
| 4-2 | Poly(1,3-propylene succinate) | 50 | −4.4 |
| 4-3 | Poly(ethylene adipate) | 50 | −6.7 |
| 4-4 | Poly(1,3-propylene adipate) | 50 | −7.8 |
| 4-5 | Poly(1,4-butyl adipate) | 50 | −3.5 |
| 4-6 | Poly[di[ethylene glycol) adipate] | 50 | −4.3 |
| 4-7 | Polycaprolactone | 50 | −2.7 |
| 4-8 | Polycaprolactone diol (Mn 530) | 50 | −5.6 |
| 4-9 | Polycaprolactone tetraol (Mn 1000) | 50 | −5.7 |
| 4-10 | Polycaprolactone-block-polytetrahydrofuran-block Polycaprolactone | 50 | −6.4 |
| | Group 5 co-additive examples in Example 6 | | |
| 5-1 | Poly(polytetrahydrofuran carbonate) diol | 50 | −6.9 |
| 5-2 | Poly(hexamethylene carbonate) diol | 50 | −4.6 |
| | Group 6 co-additive examples in Example 6 | | |
| 6-1 | polyethyleneimine | 50 | −6.3 |
| 6-2 | Poly[(o-cresyl glycidyl ether)-co-formaldehyde] (Mn 1080) | 50 | −4.6 |
| | Group 7 co-additive examples in Example 6 | | |
| 7-1 | Lithium chloride | 50 | −3.1 |
| 7-2 | Lithium benzoate | 50 | −3.6 |
| 7-3 | Lithium lactate | 50 | −3.4 |
| 7-4 | Lithium trifluoromethanesulfonate | 50 | −3.8 |
| 7-5 | Lithium stearate | 200 | −3.1 |

TABLE 1-continued

Haze Difference of (Δ haze) 1000 ppm MILLAD ® 3988 clarifying agent Without and with Co-Additives, negative number indicates a haze reduction

| Number | Co-additive | Loading of Co-additive (ppm) | Δhaze |
|---|---|---|---|
| | Group 8 co-additive examples in Example 6 | | |
| 8-1 | Fluorad FC-430 | 100 | −4.0 |
| | Group 9 co-additive examples in Example 6 | | |
| 9-1 | 1-ethyl-3-methylmidazolium chloride | 50 | −5.6 |
| 9-2 | 1-hexyl-3-methylimidazolium chloride | 50 | −3.0 |

Group 2 co-additives (No. 2-1 to 2-6) are poly(ethylene glycol) derivatives. They include, but not limited to, poly(ethylene glycol) alkyl ether, poly(ethylene glycol) alkyl ester. For example, poly(ethylene glycol) oleyl ether, and poly(ethylene glycol) monooleate were tested as co-additives and they are very effective in terms of reducing haze for 1000 ppm MILLAD® 3988 clarifying agent (over 5 units). The authors believe that the poly(ethylene glycol) chemistry is the key part, which functions as reducing haze for MILLAD® 3988 clarifying agent, and most compounds containing poly(ethylene glycol) as a part are likely going to be good co-additives for MILLAD® 3988 clarifying agent to reduce its critical concentration. For those skilled in the art, it is logical to expect other materials with similar structure will also be effective co-additives for reducing haze of MILLAD® 3988 clarifying agent, such as poly(ethylene glycol) fatty ethers, poly(ethylene glycol) fatty esters, phosphate esters with at least one arm containing segments of ethylene oxide, polyoxyethylene sorbitol hexaolate, polyoxythylene sorbitan tetraoleate.

Group 3 co-additives (No. 3-1 to 3-3) are polyalcohols and their blockcopolymers. Poly(vinyl alcohol-co-vinyl acetate) and poly(vinyl alcohol-co-ethylene) are both good co-additives for MILLAD® 3988 clarifying agent in terms of reducing haze. Polystyrene-co-allyl alcohol is also a very good one, reducing haze by 6.4 units. For those skilled in that art, it is logical to expect that polymers or copolymers containing one or more blocks of vinyl alcohol or allyl alcohol are going to be good co-additives for MILLAD® 3988 clarifying agent in terms of improving its clarification function at relatively low loadings.

Group 4 co-additives (No. 4-1 to 4-10) are polyesters and their derivatives. Polycaprolactone itself is a moderate co-additive, reducing haze by 2.7 units. On the other hand, its derivatives, like polycaprolactone diol, polycaprolactone triol, and polycaprolactone tetraol, are fairly good co-additives for MILLAD® 3988 clarifying agent in terms of improving its haze performance. As for polyesters based on aliphatic di-alcohols and aliphatic di-carboxylic acids, many of them are very effective in reducing haze of 1000 ppm MILLAD® 3988 clarifying agent, such as poly(1,3-propylene adipate), poly(ethylene adipate), etc. Examples 2 and 4 have shown more detailed study of polycaprolactone triol (Mn 900). It is a reasonable expectation that copolymers containing these chemistry mentioned here, as well as derivatives of them, are also going to be good co-additives for MILLAD® 3988 clarifying agent in terms of improving its low level efficacy.

Group 5 co-additives (No. 5-1 to 5-2) are polycarbonate derivatives. Among them, poly(polytetrahydrofuran carbonate) diol is the best, reducing haze by 6.9 haze units for 1000 ppm MILLAD® 3988 clarifying agent.

Group 6 co-additives (No. 6-1 to 6-2) are other type oligomers/polymers. Both polyethyleneimine and poly[o-cresyl glycidyl ether)-co-formaldehyde] are effective in terms of reducing haze for 1000 ppm MILLAD® 3988 clarifying agent.

Group 7 co-additives (No. 7-1 to 7-5) are small molecular compounds. Lithium containing compounds reduces haze about 3 units for 1000 ppm MILLAD® 3988 clarifying agent. Generally, they are not as effective as the best in Group 1-6, where co-additives are oligmers/polymers.

Group 8 co-additives (No. 8-1) are fluoro-containing surfactants, like Fluorad FC-430 (a commercial offering from Fluorochem Ltd.), which reduces 4 haze units for 1000 ppm MILLAD® 3988 clarifying agent.

Group 9 co-additives (No. 9-1 to 9-2) are ionic liquids based on imidazole chemistry. Two examples are given in the table and the better one, 1-ethyl-3-methyl-imidazolium chloride, reduces haze of 5.6 haze for 1000 ppm MILLAD® 3988 clarifying agent.

In summary, the authors have found many compounds can be used as co-additives to help improve the haze performance of MILLAD® 3988 clarifying agent in polypropylene resins. As a result, low level efficacy of MILLAD® 3988 clarifying agent is dramatically improved and the critical concentration is greatly reduced. Such significant improvement by using a co-additive is unexpected and is a novel invention. The optimum use level of many co-additives is only 50 ppm, while the range of 10 ppm to 100 ppm works pretty well for most co-additives.

Example 7

PEG3400 and Polycaprolactone Triol (mn 900) as Co-Additives for MILLAD® 3988 Clarifying Agent in a LLDPE Resin In addition to Example 1-6 where the current invention was targeted at polypropylene resins, it also applies to polyethylene resins like linear low density polyethylene (LLDPE). Dowlex 2517 is a well known LLDPE grade in the market, and was employed as the base resin. MILLAD® 3988 clarifying agent is the clarifying agent, co-additives tested include PEG 3400, polycaprolactone triol (Mn 900). Standard processing conditions were used and 50 mil injection molded plaques were made to measure optical properties. The results are listed in Table 2.

TABLE 2

Haze performance of MILLAD ® 3988 clarifying agent with
and without co-additives in LLDPE (Dowlex 2517)

|  | 1000 ppm Millad 3988 | 1000 ppm Millad 3988/50 ppm PEG3400 | 1000 ppm Millad 3988/50 ppm polycaprolactone triol (Mn 900) |
|---|---|---|---|
| haze | 54.6 | 49.3 | 47.3 |

Based on the results of Table 2, co-additives can also be used to reduce the haze of MILLAD® 3988 clarifying agent in LLDPE, ca. 5-7 haze units, when loading of MILLAD® 3988 clarifying agent is at 1000 ppm loading. Co-additives, which are effective in improving low level efficacy of MILLAD® 3988 clarifying agent in polypropylene resins, are likely effective in doing the same job in polyethylene resins where MILLAD® 3988 clarifying agent is a clarifier. Furthermore, these co-additives are expected to help other diacetal based clarifiers in polyethylene resins, such as bis(2, 4-dimethylbenzylidene) sorbitol and its asymmetric blend with benzylidene sorbitol.

Comparative Example 1

Poly(Propylene Glycol) as Co-Additive for MILLAD® 3988 Clarifying Agent in a RCP Resin Poly(propylene glycol) (average molecular weight is 425) was used in this example as a co-additive for MILLAD® 3988 clarifying agent. 1000 ppm MILLAD® 3988 clarifying agent without co-additive and with co-additive (loading various from 20 ppm to 1000 ppm) were processed under standard conditions. When comparing the haze performance, poly(propylene glycol) only reduces haze by 2 units at best, and several loadings only help less than 2 units. Based on this result, PPG is not an effective co-additive to help the haze performance of MILLAD® 3988 clarifying agent.

Comparative Example 2

Poly(Oxymethylene) as Co-Additive for MILLAD® 3988 Clarifying Agent in a RCP Resin A grade of poly(oxymethylene) was used in this example as a co-additive for MILLAD® 3988 clarifying agent. 1000 ppm MILLAD® 3988 clarifying agent without co-additive and with co-additive (loading various from 50 ppm to 500 ppm) were processed under standard conditions. When comparing the haze performance, poly(oxymethylene) did not reduces haze at all, it actually increases haze by over 3 units of 1000 ppm MILLAD® 3988 clarifying agent.

Combining Example 1 and Comparative Example 1 and 2, not all the polyether chemistry works as co-additive for MILLAD® 3988 clarifying agent. While poly(ethylene glycol) is very effective to improve the haze performance of MILLAD® 3988 clarifying agent, poly(propylene glycol) is very effective, and poly(oxymethylene) actually deteriorates the haze performance of MILLAD® 3988 clarifying agent.

Comparative Example 3

Sodium Dodecyl Sulfate, TWEEN® 80 Surfactant, and SPAN® 80 Emulsifying Agent as Co-Additives for MILLAD® 3988 Clarifying Agent in a RCP Resin Sodium dodecyl sulfate, TWEEN® 80 surfactant, and SPAN® 80 emulsifying agent were used in this example as co-additives for MILLAD® 3988 clarifying agent. 1000 ppm MILLAD® 3988 clarifying agent without co-additive and with co-additive (loading is 50 ppm) were processed under standard conditions. When comparing the haze performance, All the three co-additives do not change the haze of 1000 ppm MILLAD® 3988 clarifying agent. These three materials are known to be good surfactants, and apparently, not all good surfactants work well as co-additives to improve the haze performance of MILLAD® 3988 clarifying agent.

Comparative Example 4

Poly(Vinylidene Fluoride) as Co-Additive for MILLAD® 3988 Clarifying Agent in a RCP Resin Poly(vinylidene fluoride) was used in this example as a co-additive for MILLAD® 3988 clarifying agent. 1000 ppm MILLAD® 3988 clarifying agent without co-additive and with co-additive (loading various from 50 ppm to 500 ppm) were processed under standard conditions. When comparing the haze performance, poly(vinylidene fluoride) increases the haze of 1000 ppm MILLAD® 3988 clarifying agent by 1 unit or more. While fluoro-containing surfactant works as a good co-additive for MILLAD® 3988 clarifying agent (Group 8 in Example 6), this fluoro-containing polymer did not work at all in this aspect.

Comparative Example 5

Poly(Ethylene Terephthalate) and Poly(Butylenes Terephthalate) as Co-Additives for MILLAD® 3988 Clarifying Agent in a RCP Resin Poly(ethylene teraphthalate) and poly(butylenes teraphthalate) were used in this example as co-additives for MILLAD® 3988 clarifying agent. 1000 ppm MILLAD® 3988 clarifying agent without co-additive and with co-additive (loading is 50 ppm) were processed under standard conditions. When comparing the haze performance, both co-additives did not help the haze of 1000 ppm MILLAD® 3988 clarifying agent. While many polyesters are effective co-additives (Group 4 in Example 6) for MILLAD® 3988 clarifying agent to improve its haze performance, these two common polyesters tested in this examples do not work in this aspect.

Summary of Results

While most examples shown above are focused on MILLAD® 3988 clarifying agent and polypropylene resin, this invention applies to other diacetal based clarifiers, and to other types of polyolefin resins. Many good co-additives are listed, and it is a logical expectation that mixtures of them, derivatives of them, and copolymers containing them, are likely to be good co-additives as well, in terms of improving the haze performance or reducing the critical concentration of the diacetal based clarifiers, It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

Test Method of Critical Concentration and the Calculation of the Critical Concentration Reduction Many examples given above have discussed the concept of critical concentration and the reduction of it by using certain co-additives. This test method may be applied in determining the critical concentration reduction observed.

A polypropylene random copolymer, RCP SA849, is used as the resin. For a given diacetal based clarifier and a given co-additive, the following procedure will be used to measure the critical concentrations of both this clarifier and the clarifier with the help of the co-additive.

I. To create the haze curve for this clarifier in SA849 under standard processing conditions.

(a) Mix all components, SA849 fluff, Irganox1010 (recommended loading: 500 ppm) and Irgafos168 (recommended loading: 1000 ppm) as anti-oxidants, calcium stearate as acid scavenger (recommended loading: 800 ppm), a certain loading of the clarifier, using a high intensity mixer, like Henshel, for 1 minute.

(b) The mixer is then extruded at 230 C using a single screw extruder, such as a 30:1 Deltaplast extruder.

(c) The resulted pellets are then molded into twelve 50 mil plaques using a 40 ton Auburg molder, at 2.4 cc/s injection rate, 230 C molding temperature, 21 C mold temperature, and a highly polished mold.

(d) Haze of all 12 plaques is read using a haze meter, like a BYK Gardner haze meter, and the average is taken as the haze value for this loading of the clarifier in SA849.

(e) Various loadings of the clarifier are tested using steps from (a) to (d), for example, 0 ppm, 500 ppm, 750 ppm, 1000 ppm, 1500 ppm, 2000 ppm, 2500 ppm, 3500 ppm, 5000 ppm, 7500 ppm, etc. and the haze value of each loading is measured, and a haze curve is then created, just like the one in FIG. 1. The key is to make sure that the highest loading is high enough that the haze curve has a minimum point, which is the optimum haze of this clarifier.

II. To obtain the critical concentration of the clarifier from the haze curve build above.

(a) Read the control haze (A) and the optimum haze (B) from the haze curve build above, and calculate the critical haze, which equals [A+2B]/3.

(b) Draw a horizontal line along the critical haze to intercept with the haze curve build above, and the concentration at the interception is the critical concentration, as shown in FIG. 1. Let's call this critical concentration "X".

III. To establish the haze curve for MILLAD® 3988 clarifying agent with the help of the co-additive under exactly the same processing conditions as stated in (1). The only difference is to include a certain amount of the co-additive in each formulation (for example, 50 ppm).

IV. To obtain the critical concentration of the clarifier/co-additive from the haze curve of it using the same steps as in II. The critical concentration of the MILLAD® 3988 clarifying agent/co-additive is termed "Y".

V. To calculate the percentage change of the critical concentration. The reduction percentage of the critical concentration by using 50 ppm co-additive is [X−Y]/X*100%.

VI. From examples listed above, most examples work well at 50 ppm, while some work well at higher loadings, like 100 ppm, or even 1000 ppm, such as Cleatint Red®. In case 50 ppm co-additive does not provide an over 10% critical concentration based on results from V, this co-additive should be tested also at 100 ppm, 250 ppm, 500 ppm, 1000 ppm, respectively. If all the testing results do not show that the co-additive reduces the critical concentration by over 10%, the authors conclude that this co-additive is not an effective co-additive in terms of improving the low level efficacy of this clarifier. On the other hand, if in one case, the reduction of the critical concentration is over 10%, then the authors conclude that this co-additive is an effective co-additive in terms of improving the low level efficacy of this clarifier. Such clarifiers are covered in this invention, and the claims show more details.

What is claimed is:

1. A composition comprising
   (a) at least one resin selected from the group consisting of polypropylene homopolymers, polypropylene random copolymers, and polypropylene impact copolymers;
   (b) at least one diacetal-based clarifier provided in said composition at a use level of about 0.2 parts by weight or less, in relation to 100 parts by weight of the resin, wherein said at least one diacetal-based clarifier is 1,3:2,4-bis(3,4-dimethylbenzylidene) sorbitol; and
   (c) at least one co-additive selected from the group consisting of poly(ethylene glycol), and copolymers containing segments of ethylene oxide;
   wherein said co-additive has a number average molecular weight of about 300 or more;
   and wherein the use level of said co-additive is about 0.05 parts by weight or less, in relation to 100 parts by weight of the resin.

2. The composition according to claim 1 wherein the sum of the use levels of the diacetal-based clarifier and the co-additive is 0.2 parts by weight or less.

3. The composition according to claim 1 wherein the sum of the use levels of the diacetal-based clarifier and the co-additive is 0.18 parts by weight or less.

4. The composition according to claim 1 wherein the sum of the use levels of the diacetal-based clarifier and the co-additive is 0.15 parts by weight or less.

5. The composition according to claim 1 wherein the sum of the use levels of the diacetal-based clarifier and the co-additive is 0.12 parts by weight or less.

6. The composition according to claim 1 wherein the sum of the use levels of the diacetal-based clarifier and the co-additive is 0.1 parts by weight or less.

7. The composition according to claim 1 wherein the sum of the use levels of the diacetal-based clarifier and the co-additive is 0.08 parts by weight or less.

8. The composition according to claim 1 wherein the sum of the use levels of the diacetal-based clarifier and the co-additive is 0.06 parts by weight or less.

9. The composition according to claim 1 wherein the polypropylene resin is at least one member selected from the group consisting of polypropylene random copolymers and polypropylene homopolymers.

10. The composition according to claim 1 wherein the co-additive is poly(ethylene glycol) having a number average molecular weight of from about 400 to about 10,000,000.

11. The composition according to claim 1 wherein the co-additive is poly(ethylene glycol) having a number average molecular weight of from 600 to 10,000.

12. The composition according to claim 1 wherein the co-additive is a poly(ethylene glycol) having a number average molecular weight between 300 and about 10,000.

13. The composition according to claim 1 wherein the co-additive is a copolymer containing segments of ethylene oxide.

14. An article of manufacture made from the composition of claim 1.

* * * * *

UNITED STATES PATENT AND TRADEMARK OFFICE
CERTIFICATE OF CORRECTION

PATENT NO. : 8,022,133 B2  
APPLICATION NO. : 11/045630  
DATED : September 20, 2011  
INVENTOR(S) : Jiannong Xu et al.

Page 1 of 1

It is certified that error appears in the above-identified patent and that said Letters Patent is hereby corrected as shown below:

Column 18, line 46, before "resin" delete the word "polypropylene".

Signed and Sealed this  
Third Day of April, 2012

David J. Kappos  
*Director of the United States Patent and Trademark Office*